United States Patent
Chintansinh Dharmendrasinh et al.

(10) Patent No.: US 10,384,199 B2
(45) Date of Patent: Aug. 20, 2019

(54) MODIFIED HETEROGENEOUS CATALYST

(71) Applicant: RELIANCE INDUSTRIES LIMITED, Mumbai (IN)

(72) Inventors: Chudasama Chintansinh Dharmendrasinh, Bhavnagar (IN); Sachin Rawalekar, Pune (IN); Sunil Agrahari, Nagar (IN); Kalpana Gopalakrishnan, Vadodara (IN); Katravulapalli Veera Venkata Satya Bhaskara Sita Rama Murthy, Hyderabad (IN); Ajay Kumar, Vadodara (IN); Anilkumar Mettu, Narasaraopet (IN); Nagesh Sharma, Vadodara (IN); Raksh Vir Jasra, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 15/302,079

(22) PCT Filed: Jul. 17, 2015

(86) PCT No.: PCT/IB2015/055433
§ 371 (c)(1),
(2) Date: Oct. 5, 2016

(87) PCT Pub. No.: WO2016/009404
PCT Pub. Date: Jan. 21, 2016

(65) Prior Publication Data
US 2017/0216829 A1 Aug. 3, 2017

(30) Foreign Application Priority Data
Jul. 17, 2014 (IN) .......................... 2325/MUM/2014

(51) Int. Cl.
| | | |
|---|---|---|
| *B01J 33/00* | (2006.01) | |
| *B01J 37/02* | (2006.01) | |
| *B01J 21/04* | (2006.01) | |
| *B01J 23/42* | (2006.01) | |
| *B01J 23/54* | (2006.01) | |
| *C10G 35/09* | (2006.01) | |
| *B01J 23/62* | (2006.01) | |
| *B01J 23/656* | (2006.01) | |

(52) U.S. Cl.
CPC ............... *B01J 33/00* (2013.01); *B01J 21/04* (2013.01); *B01J 23/42* (2013.01); *B01J 23/54* (2013.01); *B01J 23/626* (2013.01); *B01J 23/6567* (2013.01); *B01J 37/0203* (2013.01); *B01J 37/0209* (2013.01); *B01J 37/0219* (2013.01); *B01J 37/0221* (2013.01); *C10G 35/09* (2013.01); *C10G 2300/104* (2013.01); *C10G 2300/1044* (2013.01); *C10G 2300/1051* (2013.01); *C10G 2400/30* (2013.01)

(58) Field of Classification Search
CPC . B01J 33/00; B01J 21/04; B01J 23/626; B01J 23/6567; B01J 37/0219; B01J 37/0221
USPC .......................................................... 502/334
See application file for complete search history.

(56) References Cited

U.S. PATENT DOCUMENTS

| | | | | |
|---|---|---|---|---|
| 4,559,364 A | * | 12/1985 | Wood ....................... | B01J 23/40 502/171 |
| 4,642,302 A | * | 2/1987 | Wood ....................... | B01J 23/40 502/242 |
| 4,686,314 A | * | 8/1987 | Wood ....................... | B01J 23/40 585/259 |
| 2003/0187313 A1 | * | 10/2003 | Wang ....................... | B01J 29/85 585/634 |
| 2004/0132832 A1 | * | 7/2004 | Espinoza ................. | B01J 21/04 518/716 |

OTHER PUBLICATIONS

Junling Lu et al.: "Coking and Sintering-Resistant Palladium Catalysts Achieved Through Atomic Layer Deposition"; XP009171197; Mar. 9, 2012; American Association for the Advancement of Science vol. 335, No. 6073; pp. 1205-1208.*
Hao Feng et al.: "Alumina Over-coating on Pd Nanoparticle Catalysts by Atomic Layer Deposition: Enhanced Stability and Reactivity"; XP019893439; Jan. 25, 2011; Catalysis Letters vol. 141, No. 4; pp. 512-517.*

* cited by examiner

*Primary Examiner* — Edward M Johnson
(74) *Attorney, Agent, or Firm* — Finnegan, Henderson, Farabow, Garrett & Dunner, L.L.P.

(57) ABSTRACT

A process and system for modifying heterogeneous catalysts by contacting them with chemical compounds to functionalize the surface of the heterogeneous catalyst. A polymetallic catalyst including bimetallic catalyst is functionalized on its surface by employing a precursor of an inorganic compound. The precursor of the inorganic compound is an organometallic compound, and the metal based inorganic compound is aluminum oxide. A process and system for surface modification functionalization of the heterogeneous catalysts at conditions including room temperature and atmospheric pressure.

4 Claims, 3 Drawing Sheets

MODIFIED HETEROGENEOUS CATALYST

TECHNICAL FIELD

The present disclosure relates to a process for modifying a heterogeneous catalyst with a chemical compound, to obtain modified catalyst. More particularly, the present disclosure relates to a process for convenient and easy surface modification/functionalization of supported heterogeneous catalyst such as polymetallic catalyst including bimetallic catalyst with an inorganic compound. The inorganic compound employed for surface functionalization/modification in the process of the present disclosure includes but is not limited to metal based inorganic compound such as aluminium based inorganic compound. The present disclosure also provides a system for preparing surface modified/functionalized heterogeneous catalyst by the process of the present disclosure.

BACKGROUND

Heterogeneous catalysts have been used widely in the refining and chemical processing industries for many years to facilitate and/or speeding chemical reactions. Most catalysts used in refining industry are metal supported catalysts containing one or more noble metals like platinum, palladium, silver, rhodium, iridium etc. Among these, platinum-tin based catalysts are used for petroleum refining process. Control over morphology and composition of catalysts is of particular interest in petrochemical research as it influences their activity, selectivity and affects the economy largely. In aromatics plant, catalysts are used in continuous catalytic regeneration (CCR) type reforming processes. During its use, the coke deposition occurs on the catalytically active metal surface thereby reducing their catalytic activity. Hence, the catalysts are required to be regenerated for their reuse in plant. Presently, carbon deposition (coking-the blocking of metal surface by accumulation of carbon on metal) and sintering (the formation of large metal particles, which lower overall surface area and activity) of the active catalyst constituent have been identified as main deactivation process in high temperature reaction with the heterogeneous catalyst.

Owing to higher cost of the noble metal catalyst, and the aforementioned problem of frequent regeneration, minor improvement in the conversion yield as well as the life span of the catalyst has been targeted ever since. To address the deactivation of heterogeneous catalyst occurs through coking, the bimetallic catalyst have been produced; wherein, the cost of the active metal is reduced by replacing some of the atoms by less expensive alternative transition metals. Furthermore, the bimetallic catalysts govern the higher selectivity for the product due to synergic effect of differences in the adsorption energies over the surface of constituent elements and their electronic properties. Previously, atomic layer deposition method have been commonly used to functionalize the catalytic materials or substrates; wherein, the liquid precursors are decomposed at higher temperature and their vapours are deposited on target materials under vacuum condition. The atomic layer deposition on the materials is carried out in specially designed chemical reactor; wherein, temperature and vacuum are controlled in predicted manner. This ALD method was previously used for functionalizing the catalysts such as Pd with $Al_2O_3$, Pt—Re with $Al_2O_3$ or Pt—Ir with $Al_2O_3$. US 2008/0038463 A1 also relates to a method for depositing a material on a substrate during an atomic layer deposition (ALD) process which includes positioning the substrate on a substrate support within a process chamber, flowing a carrier gas into an expanding channel to form a circular flow of the carrier gas, exposing the substrate to the circular flow, and depositing a material onto the substrate. The method further provides that the process chamber has a chamber lid containing a centrally positioned expanding channel, a tapered bottom surface extending from the expanding channel to a peripheral portion of the chamber lid, at least two gas inlets in fluid communication with the expanding channel, and at least two conduits positioned to provide a gas flow having a circular pattern within the expanded channel. Thus, the process requires complex processing chamber and specifically designed reactor for carrying out the ALD process. U.S. Pat. No. 6,305,314 B1 also relates to a method and apparatus for avoiding contamination of films deposited in layered depositions, such as Atomic Layer Deposition (ALD) and other sequential chemical vapor deposition (CVD) processes, wherein CVD-deposited contamination of ALD films is prevented by use of a pre-reaction chamber that effectively causes otherwise contaminating gaseous constituents to deposit on wall elements of gas-delivery apparatus prior to entering the ALD chamber. Further, other prior work such as

*Rev. Sci. Instrum.,* Vol. 73, No. 8, August 2002, 2981; and *Chem. Soc. Rev.,* 2011, 40, 5242-5253 also provides complex procedures for coating of catalyst surface and thereby requiring sophisticated apparatus/system for workability, which are inconvenient for scaling-up. Similarly, articles in *Science* 335, 1205 (2012) and *Catalysis Letters* 141, 512 (2011) also provide specific systems and reactors for carrying out surface layering of metallic catalysts.

As can be observed, most of the processes known in the aforementioned prior arts provide processes which have specific procedural requirements and/or high energy requirements. Therefore, carrying out such processes at a commercial scale for the large quantity of catalyst spheres/extrudates is difficult and costly. Thus there is a need for an easy, economic and convenient process of layering the catalyst, which does not involve specifically designed apparatus or particularly designed reactors, and are commercially viable and scalable.

SUMMARY OF THE DISCLOSURE

The present disclosure relates to a process for modifying a heterogeneous catalyst including but not limiting to a polymetallic catalyst and such as a bimetallic catalyst by contacting the said catalyst with a chemical compound including but not limiting to precursor of inorganic compound, wherein the precursor is an organometallic compound. The process of the present disclosure is an easy, economic and commercially scalable process which avoids the need of specialized reactors, apparatus and facility and high energy requirements.

In an exemplary embodiment, the present disclosure relates to a process for modifying a polymetallic catalyst with an inorganic compound such as metal based inorganic compound by contacting the polymetallic catalyst with a precursor of inorganic compound, wherein the precursor is organometallic compound such as organoaluminium compound.

In an exemplary embodiment, a process for modifying a heterogeneous catalyst, said process comprising steps of: (a) contacting the heterogeneous catalyst with a solution of organometallic compound; (b) allowing the heterogeneous catalyst to react with the solution of organometallic compound; (c) contacting the reacted heterogeneous catalyst of step b) with inert hydrocarbon solvent; (d) repeating the steps a) to c) at least twice to obtain the heterogeneous catalyst having at least two modifying layers; and (e) drying the heterogeneous catalyst obtained in step d), followed by calcination dried heterogeneous catalyst to obtain the modified heterogeneous catalyst.

In an embodiment, the modification of the present disclosure includes but is not limited to coating, depositing or layering of inorganic compound such as metal based inorganic compound on the surface of the heterogeneous catalyst.

In some embodiments, the present disclosure provides a process for surface functionalization/modifying polymetallic catalyst comprising at least two metals, selected from a group comprising platinum, tin, palladium, rhodium, ruthenium, iridium, rhenium, niobium, lithium, magnesium and gallium, wherein the polymetallic catalyst comprises a support material including but not limited to inorganic compound.

The present disclosure further relates to a heterogeneous catalyst comprising a modifying layer on surface of the heterogeneous catalyst.

The present disclosure furthermore relates to a process for preventing deposition of carbon on surface of a heterogeneous catalyst, said process comprising step of subjecting the heterogeneous catalyst to a solution of organometallic compound for modifying the heterogeneous catalyst with a layer of inorganic compound.

The present disclosure also provides a system for carrying out the process of the present disclosure by employing precursor of inorganic compound, wherein the precursor is an organometallic compound in a liquid form, at conditions including but not limiting to room temperature and atmospheric pressure.

In some embodiments, the present disclosure provides a modified or surface functionalized heterogeneous catalyst including but not limiting to polymetallic catalyst such as bimetallic catalyst supported on the inorganic compound, respectively, and wherein such modified/functionalized heterogeneous catalyst is employed in processes including but not limiting to hydrocarbon processing, petroleum refining and catalytic reforming.

BRIEF DESCRIPTION OF THE ACCOMPANYING FIGURES

In order that the disclosure may be readily understood and put into practical effect, reference will now be made to exemplary embodiments as illustrated with reference to the accompanying figures. The figures together with a description below are incorporated in and form part of the specification, and serve to further illustrate the embodiments and explain various principles and advantages, in accordance with the present disclosure where:

DETAILED DESCRIPTION

Figure 1A:
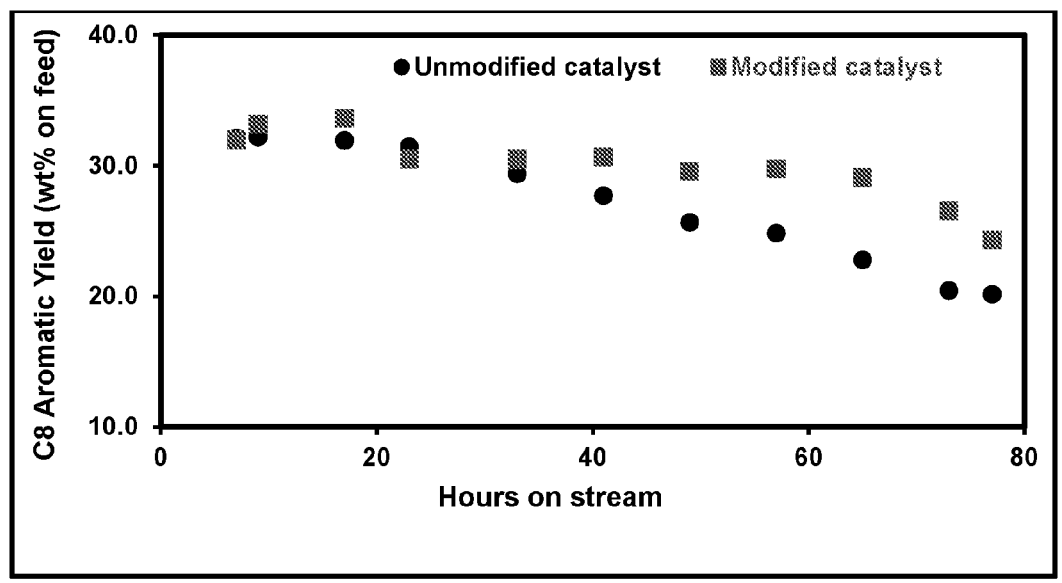
FIG. 1(a) illustrates yield of C8 aromatic compounds by Pt—Sn catalyst modified as per the process of the present disclosure, compared with un-modified catalyst.

The present disclosure relates to a process for modifying a heterogeneous catalyst such as polymetallic catalyst including a bimetallic catalyst by contacting the said heterogeneous catalyst with a chemical compound.

In a non-limiting embodiment, the present disclosure relates to a process for modifying surface of the heterogeneous catalyst such as polymetallic catalyst including a bimetallic catalyst by contacting the said heterogeneous catalyst with a chemical compound including but not limiting to precursor of inorganic compound such as metal based inorganic compound, wherein the precursor is an organometallic compound.

In a non-limiting embodiment, the present disclosure relates to a process for modifying a heterogeneous catalyst such as polymetallic catalyst including a bimetallic catalyst by contacting said heterogeneous catalyst with a precursor of inorganic compound, wherein the inorganic compound is a metal based inorganic compound including but not limiting to aluminium based inorganic compound, and wherein the precursor is an organometallic compound including but not limiting to a metal based organic compound such as aluminium based organic compound.

In an exemplary embodiment, the present disclosure relates to a process for modifying a heterogeneous catalyst by contacting it with a precursor of metal based inorganic compound including but not limiting to aluminium based inorganic compound. Thus, in one embodiment, the heterogeneous catalyst is contacted with a precursor of aluminium based inorganic compound.

In another exemplary embodiment, the present disclosure relates to a process for modifying a heterogeneous catalyst by contacting it with a precursor of metal based inorganic compound, wherein the precursor is an organometallic compound including but not limiting to a metal based organic compound such as aluminium based organic compound. Thus, in one embodiment, the heterogeneous catalyst is contacted with an organometallic compound, such as aluminium based organic compound.

In another non-limiting embodiment of the present disclosure, the polymetallic catalyst including bimetallic comprises at least two metals selected from a group comprising platinum, tin, palladium, rhodium, ruthenium, iridium, rhenium, niobium, lithium, magnesium and gallium, or any combination thereof.

In an alternate embodiment of the present disclosure, the polymetallic catalyst including bimetallic catalyst comprises at least one transition metal or at least one noble metal, or a combination thereof.

In an exemplary embodiment, the polymetallic catalyst including bimetallic catalyst comprises a support matrix including but not limiting to alumina, silica, titania, alumina-silica and zirconia, or any combination thereof.

In an exemplary embodiment, the polymetallic catalyst is selected from a group comprising platinum-tin-ridium catalyst, platinum-tin-rhodium catalyst, platinum-tin-ruthenium catalyst, platinum-tin catalyst, platinum-rhenium catalyst and platinum-germanium catalyst or any combination thereof, wherein the platinum-tin catalyst, platinum-rhenium catalyst and platinum-germanium catalyst are referred to as bimetallic catalyst.

In a preferred embodiment of the present disclosure, the polymetallic catalyst comprises support matrix including but not limiting to a metal based inorganic compound such as aluminium based inorganic compound, for example an aluminium oxide. In an exemplary embodiment, the aluminium oxide is an aluminium (III) oxide or alumina ($Al_2O_3$).

In a preferred embodiment, the present disclosure relates to a process for modifying a polymetallic catalyst by contacting the catalyst with a precursor of metal based inorganic compound, wherein the precursor is a metal based organic compound. Such polymetallic catalysts are employed in processes including but not limiting to hydrocarbon processing, petroleum refining and catalytic reforming.

In an exemplary embodiment, the present disclosure relates to a process for modifying a polymetallic catalyst such as platinum-tin-iridium catalyst, platinum-tin-rhodium catalyst, platinum-tin-ruthenium catalyst, platinum-tin catalyst, platinum-rhenium catalyst and platinum-germanium catalyst, or any combination thereof by contacting the catalyst with a precursor of inorganic compound, wherein the precursor is a metal based organic compound including but not limiting to aluminium based organic compound such as triethylaluminium. The inorganic compound for which triethylaluminium is the precursor is a metal based inorganic compound including but not limiting to aluminium based inorganic compound such as aluminium oxide.

In a preferred embodiment, the present disclosure relates to a process for modifying a polymetallic catalyst such as platinum-tin-iridium catalyst, platinum-tin-rhodium catalyst, platinum-tin-ruthenium catalyst, platinum-tin catalyst, platinum-rhenium catalyst and platinum-germanium catalyst, or any combination thereof by contacting the catalyst with aluminium based organic compound such as triethylaluminium, wherein triethylaluminium is a precursor of aluminium based inorganic compound such as aluminium oxide.

In a non-limiting embodiment, the use of same compound as a support of the polymetallic catalyst and surface modifying agent does not alter catalyst properties including surface area, metal dispersion, surface of the catalyst, pore volume, bulk density of the catalyst after surface modification. Therefore, in present polymetallic catalyst, the support of the polymetallic catalyst and the outer layer on the surface of the catalyst consist of same compound such as alumina, also known as aluminium oxide ($Al_2O_3$). Thus, use of the same compound as a support and outer layer, protects the key properties of the catalyst, and enhances reactivity of the modified catalyst.

In a non-limiting embodiment, modifying the heterogeneous catalyst including but not limiting to polymetallic catalyst, independently by the process of present disclosure leads to surface functionalization of the catalyst. In an exemplary embodiment, the surface functionalization of the polymetallic catalyst including bimetallic catalyst of the present disclosure provides effects including but not limiting to— a) reduction in carbon deposition on the catalyst;
b) reduction in sintering of the catalyst; and
c) reduction or elimination of deactivation of the catalyst.

In a preferred embodiment, the polymetallic catalyst is layered with at least one layer of the metal based inorganic compound such as aluminium based inorganic compound by the process of the present disclosure. In an alternate preferred embodiment, the polymetallic catalyst is layered with multiple layers of the metal based inorganic compound such as aluminium based inorganic compound by the process of the present disclosure. The thickness of the layer(s) of the metal based inorganic compound such as aluminium based inorganic compound is in the range of about 6 nm to about 12 nm depending on the concentrations and/or amounts of the reactants, i.e., polymetallic catalyst and precursor of aluminium based inorganic compound, wherein the precursor is organoaluminium compound.

In another preferred embodiment, the process of the present disclosure is self-limited and based on the surface reactions between the catalyst and the precursor of inorganic compound and thickness of the protective inorganic layer used for functionalization of the polymetallic catalyst is finely controlled to single monolayer level. The process is finely controlled due to the presence of OH group on the surface of the catalyst upon reacting it with TEAL solution having about 0.3% to about 0.7% of TEAL in the solution, followed by treatment with toluene with 200 ppm to 400 ppm moisture content.

In a non-limiting embodiment, the layer(s) of the aluminium based inorganic compound including but not limiting to aluminium oxide on the heterogeneous catalyst such as polymetallic catalyst including bimetallic catalyst provides a protective covering to the catalyst surface and prevents active metal leaching from the surface when exposed to conditions including but not limiting to high temperature ranging from about 520° C. to about 540° C. and high pressure ranging from about 7 kg/cm$^2$ to about 8 kg/cm$^2$. The layer(s) is covering the metal particles on the surface of the catalyst in such a way that it breaks up the periodicity of the surface of the polymetallic catalyst and creates pore channels which provide interface for the metals on the surface of the catalyst for the reaction. These channels are large enough for the metals of the catalyst to participate in the reaction but too small to support coke formation on the surface of catalyst.

In an exemplary embodiment, the process of modifying the polymetallic catalyst including bimetallic catalyst forms conformal and nano thick films of alumina that is controlled to a thickness ranging from about 6 nm to about 12 nm and is chemically bonded to catalyst particle surface. Alumina bonded to the surface of the catalyst covers the metal particles on the surface in such a way that it breaks up the periodicity of the surface thereby creating pore channels on the surface that is too small to support coke formation on the surface of catalyst but accessible for the reactants. Therefore surface modification of the polymetallic catalyst increases the life span and performance of the catalyst without changing their key properties.

In a preferred embodiment, the surface modification of the polymetallic catalyst such as platinum-tin-iridium catalyst, platinum-tin-rhodium catalyst, platinum-tin-ruthenium catalyst, platinum-tin catalyst, platinum-rhenium catalyst and platinum-germanium catalyst increases the life span and performance of the catalyst without changing their key properties, for e.g., crystal structure, surface area, metal dispersion, bulk density and catalytic activity.

TABLE-1

Catalyst characterization data of modified and unmodified

| Parameter | Unmodified catalyst | Modified catalyst |
|---|---|---|
| BET SA m$^2$/g | 168 | 176 |
| PV cc/g | 0.60 | 0.64 |
| PS Å | 124 | 145 |
| Metal dispersion | 86 | 92 |
| NH$_3$ Adsorption m · mol/g | 0.73 | 0.92 |
| Bulk Density (cc/g) | 0.71 | 0.65 |
| % Chloride | 0.91 | 0.56 |

The process of the present disclosure for modifying the heterogeneous catalyst such as polymetallic catalyst including bimetallic catalyst is an easier and more simplified process than conventionally known processes for coating or layering of the catalyst for surface functionalization/modification. This process is also commercially scalable as it does not require specifically designed reactor, apparatus or facility to achieve the same. In a non-limiting embodiment, the process of the present disclosure is carried out by using liquid precursor of the aluminium based inorganic compound at conditions including but not limiting to room temperature and atmospheric pressure, wherein the room temperature is ranging from about 20° C. to about 40° C. and the atmospheric pressure is ranging from about 740 mmHg to about 780 mmHg. The process is carried out in such a way that the activity of the polymetallic catalyst including bimetallic catalyst is not altered even after layering with the metal based organic compound such as aluminium based organic compound. Further, Table 1 illustrates that the characteristics/properties of the heterogeneous catalyst after modification by the process of the present disclosure is not significantly altered when compared to an unmodified heterogeneous catalyst. However, the difference in the numbers observed in Table 1 between the modified catalyst and unmodified catalyst are only with respect to the standard deviation observed during the measurement of the characteristics/properties of the catalysts. However, a person skilled in the art would understand that these differences are not statistically significant and thereby these minor differences do not lead to change in the characteristics/properties of the catalyst.

In a non-limiting embodiment, the process of modifying a heterogeneous catalyst such as polymetallic catalyst including bimetallic catalyst with a chemical compound including but not limiting to a metal based inorganic compound comprises steps of:
 a) contacting the heterogeneous catalyst with at least one chemical compound under nitrogen atmosphere and allowing their reaction for a predetermined amount of time; and
 b) removing unreacted or excess compound from the reaction and drying the reacted heterogeneous catalyst of step (a) to obtain the modified heterogeneous catalyst.

In a non-limiting embodiment, the reaction between the heterogeneous catalyst such as polymetallic catalyst including bimetallic catalyst and the chemical compound is allowed for a time period of at least 30 seconds. Preferably, the reaction occurs for a time period ranging from about 0.5 minute to about 1.5 minutes, more preferably for 1 minute.

In another non-limiting embodiment, the heterogeneous catalyst is pre-heated at predetermined temperature to remove moisture and activate the catalyst prior to contacting with the chemical compound.

In another non-limiting embodiment, the heterogeneous catalyst upon reaction with the chemical compound is calcined after the step of drying to obtain the modified heterogeneous catalyst.

In an exemplary embodiment, the chemical compound is re-contacted with the heterogeneous catalyst to further modify the already modified heterogeneous catalyst, to prepare a heterogeneous catalyst with two coatings or layers of the chemical compound on the heterogeneous catalyst. In a preferred embodiment, the process of the present disclosure is repeated to provide multiple coatings or layers of the chemical compound on the heterogeneous catalyst.

In a non-limiting embodiment, the process of modifying a heterogeneous catalyst such as polymetallic catalyst including bimetallic catalyst with an inorganic compound comprises steps of:
 a) contacting the heterogeneous catalyst with a solution of metal based organic compound under nitrogen atmosphere;
 b) allowing the heterogeneous catalyst to react with the solution of metal based organic compound for a predetermined amount of time;
 c) removing unreacted or excess solution from the reaction by employing a second solvent-B, followed by contacting the reacted heterogeneous catalyst of step (b) with a third solvent-C for a predetermined amount of time to obtain the heterogeneous catalyst with a modifying layer;
 d) repeating steps (a) to (c) at least twice to obtain the heterogeneous catalyst having desired thickness of modifying layer; and
 e) drying the heterogeneous catalyst obtained in step (c) or (d) at predetermined temperature for predetermined amount of time, followed by calcining the dried heterogeneous catalyst to obtain the modified heterogeneous catalyst with one or more layer of the metal based inorganic compound.

In a non-limiting embodiment, the heterogeneous catalyst is pre-heated at a temperature ranging from about 80° C. to about 150° C. to remove moisture and activate the heterogeneous catalyst prior to contacting with the metal based organic compound, wherein the metal based organic compound is a precursor of metal based inorganic compound.

In a non-limiting embodiment, the solution of the metal based organic compound is prepared by dissolving the metal based organic compound in a first solvent-A at a concentration ranging from about 0.1% to about 5%.

In a non-limiting embodiment, the reaction between the heterogeneous catalyst and the metal based organic compound is allowed for a time period of at least 30 seconds. Preferably, the reaction occurs for a time period ranging from about 0.5 minute to about 1.5 minutes.

In a non-limiting embodiment, the reacted heterogeneous catalyst is contacted with a third solvent-C for a time period of at least 30 seconds. Preferably, the contact occurs for a time period ranging from about 0.5 minute to about 1.5 minutes.

In another non-limiting embodiment, the modifying layer is an inorganic compound including but not limiting to aluminium based inorganic compound.

In another non-limiting embodiment, upon reacting the heterogeneous catalyst with the metal based organic compound for at least twice, the said heterogeneous catalyst is dried at a temperature ranging from about 80° C. to about150° C. for a time period ranging from about 6 hours to about 24 hours, and thereafter the dried heterogeneous catalyst is subjected to calcination at a temperature ranging from about 400° C. to about 650° C. for a time period ranging from about 3 hours to about 8 hours.

In another non-limiting embodiment, the first solvent-A, the second solvent-B and the third solvent-C employed in the process of the present disclosure are same solvents with same moisture content, same solvents with different moisture content, different solvents with different moisture content or any combination thereof. The solvent employed in the process of the present disclosure includes but is not limited to inert hydrocarbon solvents such as aromatic solvent, saturated aliphatic solvent, and cycloaliphatic hydrocarbon solvent. The solvent employed in the process of the present disclosure includes but is not limited to toluene, heptane, hexane and cyclohexane, or any combination thereof. In a preferred embodiment, the solvent-A, solvent-B and solvent-C, respectively employed in the process of the present disclosure is benzene derived organic solvent such as toluene having varied or same moisture content or a combination thereof.

In an exemplary embodiment, the first solvent-A is toluene with a moisture content ranging from about 20 ppm to about 40 ppm, the second solvent-B is toluene with moisture content ranging from about 20 ppm to about 40 ppm, preferably about 30 ppm, and the third solvent-C is toluene with moisture content ranging from about 200 ppm to about 400 ppm, preferably about 300 ppm.

In a preferred embodiment, the present disclosure provides a process for modifying a polymetallic catalyst selected from a group comprising platinum-tin-iridium catalyst, platinum-tin-rhodium catalyst, platinum-tin-ruthenium catalyst platinum-tin catalyst, platinum-rhenium catalyst and platinum-germanium catalyst, with a metal based inorganic compound, said process comprises steps of:
  a) contacting the polymetallic catalyst with a solution of organometallic compound under nitrogen atmosphere;
  b) allowing the polymetallic catalyst to react with the solution of organometallic compound for a time period ranging from about 0.5 minute to about 1.5 minutes;
  c) removing unreacted or excess compounds from the reaction by employing a second solvent-B, followed by contacting the reacted polymetallic catalyst of step (b) with a third solvent-C for a time period ranging from about 0.5 minute to about 1.5 minutes to obtain the polymetallic catalyst with a modifying layer;
  d) repeating steps (a) to (c) to obtain the polymetallic catalyst having desired thickness of modifying layer; and
  e) drying the polymetallic catalyst obtained in step (c) or (d) at a temperature ranging from about 80° C. to about 150° C. for a time period ranging from about 6 hours to about 24 hours, followed by calcinating the dried polymetallic catalyst at a temperature ranging from about 400° C. to about 650° C. for a time period ranging from about 3 hours to about 8 hours to obtain the modified polymetallic catalyst with one or more layer of the metal based inorganic compound.

In a non-limiting embodiment, the process steps a) contacting the polymetallic catalyst with solution of metal based organic compound under nitrogen atmosphere; b) allowing the polymetallic catalyst to react with the solution of metal based organic compound for a time period ranging from about 0.5 minute to about 1.5 minutes; and c) removing unreacted or excess compounds from the reaction by employing a second solvent-B, followed by contacting the reacted polymetallic catalyst of step b) with a third solvent-C for a time period ranging from about 0.5 minute to about 1.5 minutes to obtain the polymetallic catalyst with a modifying layer, are repeated at least once to obtain at least two modifying layers. In a preferred embodiment, the steps are repeated for about 3 times to about 6 times to obtain a total of about 4 to about 7 modifying layers having a desired thickness of the modifying layer on the surface of the polymetallic catalyst. The thickness of the modifying layer on the surface of the polymetallic catalyst after completion of one cycle of the reaction is about 6 nm to about 12 nm, and the thickness of the modifying layer is dependent on bond length and bond formation pattern on catalyst surface.

In a non-limiting embodiment, the polymetallic catalyst is pre-heated at a temperature ranging from about 80° C. to about 150° C. for a duration of about 6 hours to about 16 hours to remove moisture and activate the polymetallic catalyst prior to contacting with the metal based organic compound, wherein the metal based organic compound is a precursor of metal based inorganic compound.

In a non-limiting embodiment, the solution of the metal based organic compound is having metal based organic compound at a concentration ranging from about 0.3% to about 0.7% with respect to the catalyst.

In another non-limiting embodiment, the modifying layer is an inorganic compound including but not limiting to aluminium based inorganic compound.

In an exemplary embodiment, the metal based organic compound is a precursor of metal based inorganic compound such as aluminium based inorganic compound including but not limiting to aluminium oxide. In a preferred embodiment, the metal based organic compound is organoaluminium including but not limiting to triethyl aluminium and trimethyl aluminium or combination thereof.

In a non-limiting embodiment, in the process of modifying the polymetallic catalyst, removing unreacted or excess compounds includes—steps such as—
  a) removing excess solution of organometallic compound under vacuum;
  b) washing unreacted metal based organic compound and unreacted polymetallic catalyst with solvent-B; and
  c) removing excess solvent-B under vacuum.

In an exemplary embodiment, the triethyl aluminium employed in the process of the present disclosure reacts with the polymetallic catalyst such as platinum-tin-iridium catalyst, platinum-tin-rhodium catalyst, platinum-tin-ruthenium catalyst, platinum-tin catalyst, platinum-rhenium catalyst and platinum-germanium catalyst having alumina as support matrix, respectively, wherein the reacted triethylaluminium is converted into alumina upon calcination on the surface of the polymetallic catalyst. Triethylaluminium reacts with available hydroxyl (—OH) group on the surface of polymetallic catalyst, followed by forming O—Al bond and the ethane of triethylaluminium is released. After this step, when the moisturized toluene having a moisture content of about 200 ppm to about 400 ppm (solvent-C) is added to the polymetallic catalyst, the remaining two ethyl molecules of the triethylaluminium are released and two —OH groups are created. On calcination, this moiety is converted to alumina on the surface of the polymetallic catalyst.

In an exemplary embodiment, the first solvent-A, the second solvent-B and the third solvent-C employed in the process of the present disclosure are same solvents with same moisture content, same solvents with different moisture content, different solvents with different moisture content or any combination thereof. The solvent employed in the process of the present disclosure includes but is not limited to organic solvents such as aromatic solvent, saturated aliphatic solvent, and cycloaliphatic hydrocarbon solvent. In a preferred embodiment, the solvent-A, solvent-B and solvent-C, respectively employed in the process of the present disclosure is benzene derived organic solvent such as toluene having varied or same moisture content, or a combination thereof. The process of the instant disclosure employs toluene having moisture content ranging from about 20 ppm to about 40 ppm as solvent and 0.5% Triethyl aluminium solution is prepared in this toluene. Further, this toluene is also employed towards removal of excess unreacted triethylaluminium. On the other hand, comparatively high moisture content toluene, having a moisture content of about 200 ppm to about 400 ppm is employed for hydrolysis of reacted triethylaluminium on the surface of the polymetallic catalyst.

In an exemplary embodiment, the present disclosure thus provides a simple and economical process for surface modification/functionalization of heterogeneous catalyst such as polymetallic catalyst including bimetallic catalyst, which provides effects including but not limiting to reduction in carbon deposition, reduction in sintering, reduction in deactivation of the catalyst and enhancement in stability, efficiency, activity and selectivity of the catalyst. The modified heterogeneous catalyst of the present disclosure leads to about 56% reduction in coke formation.

The surface modification/functionalization of the heterogeneous catalyst such as polymetallic catalyst including bimetallic catalyst further increases the life span and performance of the catalyst without significantly changing their key properties, for e.g., crystal structure, surface area, metal dispersion, bulk density and catalytic activity. The process for modification/functionalization coats the protective layer on the polymetallic catalyst using liquid precursor of metal based inorganic compound at room temperature ranging from about 20° C. to about 40° C. and atmospheric pressure ranging from about 740 mmHg to about 780 mmHg and is therefore a convenient and commercially viable, because the process of modification is carried at room temperature and atmospheric pressure without requiring any additional component in the process to maintain temperature and pressure, respectively. The heterogeneous catalyst post modification/functionalization by the process of present disclosure is therefore substantially protected against coke formation during its use in the reaction and/or in the reactor. This also provides longer life for the heterogeneous catalyst and delays the regeneration requirements, wherein the modified catalyst life is enhanced by about 30% to about 40% when compared to an unmodified catalyst during its reaction time, thus reducing the frequency of regeneration requirement of the modified catalyst. The process also ensures that the catalytic activity of the modified heterogeneous catalyst such as modified polymetallic catalyst including modified bimetallic catalyst is not altered after the layering of metal based inorganic compound such as aluminium based inorganic compound including but not limiting to aluminium oxide.

The process of the present disclosure is advantageous over the conventionally known processes because, conventional processes employ the precursor in vaporized state, which is injected into the reactor at a desired flow and concentration under inert atmosphere for a desired period of time. This is followed by completely evacuating the reactor and hydrolysing the deposited precursor on the substrate by introducing water vapour at desired concentration along with inert gas. On the other hand, the process of the present disclosure employs liquid precursor for modifying/functionalizing the heterogeneous catalyst at room temperature and at atmospheric pressure, thereby removing the need of specialized reactors and/or process controllers to maintain high temperature and inert atmosphere. Thus the process of the present disclosure is considered to be easy, convenient, economical and advantageous over the conventional processes. Further, the conventional processes require more number of cycles for modifying the heterogeneous catalyst due to the use of vaporized precursor, whereas the process of the present disclosure requires minimum number of cycles for modifying the heterogeneous catalyst due to the use of liquid precursor. In addition, the process of the present disclosure leads to better reduction in carbon deposition, better reduction in sintering, and better reduction in deactivation of the catalyst when compared to the catalyst modified by the conventional processes.

In an alternate embodiment, the present disclosure provides a polymetallic catalyst including bimetallic catalyst having support matrix, modified with a metal based inorganic compound such as aluminium based inorganic compound including but not limiting to aluminium oxide. The polymetallic catalyst of the present disclosure is modified by the process of the present disclosure which is an easy, convenient and economical process for modification of the catalyst. The modified polymetallic catalyst of the present disclosure showcases reduced carbon deposition (coking) and reduced sintering of metal ions on its surface during its application in the reaction, wherein the carbon deposition in the catalyst modified by the process of instant disclosure is less than 2 wt % per kg of the feed processed, whereas the carbon deposition in the unmodified catalyst is about 6 wt % per kg of the feed processed. From this, it is observed that there is a reduction of at least 4 wt % in carbon deposition per kg of feed processed by the modified catalyst of the present disclosure.

In a non-limiting embodiment, the polymetallic catalyst of the present disclosure has modification in a form including but not limiting to coating, deposition and layering of a metal based inorganic compound. The polymetallic catalyst preferably has at least one layer of the metal based inorganic compound such as aluminium based inorganic compound including but not limiting to aluminium oxide.

In an exemplary embodiment, the present disclosure provides a polymetallic catalyst selected from a group comprising platinum-tin-iridium catalyst, platinum-tin-rhodium catalyst, platinum-tin-ruthenium catalyst, platinum-tin catalyst, platinum-rhenium catalyst and platinum-germanium catalyst having at least one layer of aluminium based inorganic compound, such as aluminium oxide on the surface of the said catalyst. Such a modified polymetallic catalyst is prepared by the process of the present disclosure which provides surface modification/functionalization of the catalyst with a metal based inorganic compound. The modified catalyst of the present disclosure withstands stability for longer time when compared to catalyst which is unmodified as per the process of the present disclosure, wherein the stability of the modified polymetallic catalyst is enhanced by about 30% to about 40% when compared to an unmodified catalyst.

In another alternate embodiment, the present disclosure provides a system for modifying heterogeneous catalyst such as polymetallic catalyst including bimetallic catalyst, with a metal based inorganic compound, system is devoid of specifically designed chemical reactor and does not require controllers in the system to control parameters such as temperature and pressure in a predicted manner. For instance, in the systems that are conventionally used for surface modification of the catalyst, the precursor is vaporized and injected into the reactor at a desired flow rate and concentration under inert atmosphere for a desired period of time, followed by completely evacuating the reactor and the deposited precursor on the substrate is hydrolysed by introducing water vapour at desired concentration along with inert gas. Since the precursor that is employed for modification is in the vaporized state, the reactor to be employed has to be maintained at a high temperature and at inert pressure unlike in the system of the present disclosure. Since the process for modification of the present disclosure is carried under room temperature and atmospheric pressure, the system need not have any specific controllers to maintain high temperature and inert pressure. Therefore, the conventionally used system requires specifically controlled reactors unlike the system of the present disclosure and thus it is evident that the process and system that is employed in the present disclosure for modifying/functionalizing a polymetallic catalyst is easy, convenient and economical.

The system provided herein facilitates the process of the present disclosure which is carried out by using liquid precursor of the metal based inorganic compound such as aluminium based inorganic compound including but not limiting to aluminium oxide at conditions including but not limiting to room temperature ranging from about 25° C. to about 40° C. and atmospheric pressure ranging from about 740 mmHg to about 780 mmHg.

In a non-limiting embodiment, the terms metal based organic compound and organometallic compound are used interchangeably in the description herein, wherein the terms metal based organic compound and organometallic compound means chemical compounds containing at least one bond between a carbon atom of an organic compound and a metal.

Additional embodiments and features of the present disclosure will be apparent to one of ordinary skill in art based upon the description provided herein. The embodiments herein provide various features and advantageous details thereof in the description. Descriptions of well-known/conventional methods and techniques are omitted so as to not unnecessarily obscure the embodiments herein. The examples provided herein are intended merely to facilitate an understanding of ways in which the embodiments herein may be practiced and to further enable those of skill in the art to practice the embodiments herein. Accordingly, the following examples should not be construed as limiting the scope of the embodiments herein.

EXAMPLES

Example 1 a) Process for Surface Modification of Heterogeneous Catalysts by Employing Single Cycle Reaction:
  i. Surface Modification of Platinum-Tin Catalyst Having Alumina Support Matrix:
  Preheating about 25 g of heterogeneous catalyst such as platinum-tin catalyst having an alumina support at temperature of about 120° C. to activate and to remove moisture from the catalyst. Separately, Triethyl aluminium (TEAL) solution is prepared having about 0.5% TEAL concentration in toluene. Activated heterogeneous catalyst is transferred to round bottom flask or a reactor under nitrogen atmosphere and about 30 ml of prepared TEAL solution is added under nitrogen atmosphere to round bottom flask/containing the activated catalyst. TEAL solution is allowed to react with the activated catalyst surface for about 1 minute and excess amount of TEAL solution is removed under vacuum, followed by washing the unreacted TEAL from the surface of the catalyst by using about 30 mL (0.83w/v) toluene having a moisture content ranging from about 20 ppm to about 40 ppm and removing the excess toluene from the round bottom flask/reactor under vacuum. Adding about 30 ml of toluene having a moisture content ranging from about 200 ppm to about 400 ppm to round bottom flask and this moisture containing toluene is allowed to react with the heterogeneous catalyst for about 1 minute, followed by removing excess amount of toluene under vacuum. The catalyst is withdrawn from the round bottom flask and dried at temperature of about 120° C. for a time period of about 16 hours, followed by calcinating at temperature of about 550° C. for a time period of about 6 hours.

ii. Surface Modification of Platinum-Rhenium Catalyst Having Alumina Support Matrix:
  Preheating about 25 g of heterogeneous catalyst such as platinum-rhenium catalyst having alumina support matrix at temperature of about 120° C. to activate and to remove moisture from the catalyst. Separately, Triethyl aluminium (TEAL) solution is prepared having about 0.5% TEAL concentration in toluene. Activated heterogeneous catalyst is transferred to round bottom flask or a reactor under nitrogen atmosphere and about 30 ml of prepared TEAL solution (about 0.83 w/v) is added under nitrogen atmosphere to round bottom flask containing the activated catalyst. TEAL solution is allowed to react with the activated catalyst surface for about 1 minute and excess amount of TEAL solution is removed under vacuum, followed by washing the unreacted TEAL from the surface of the catalyst by using toluene having a moisture content ranging from about 20 ppm to about 40 ppm and removing the excess toluene from round bottom flask under vacuum. Adding about 30 ml of toluene having a moisture content ranging from about 200 ppm to about 400 ppm to round bottom flask and this moisture containing toluene is allowed to react with the heterogeneous catalyst for about 1 minute, followed by removing excess amount of toluene under vacuum. The catalyst is withdrawn from the round bottom flask and dried at a temperature ranging of 120° C. for a time period of about 16 hours and followed by calcinating at a temperature of about 550° C. for a time period of about 6 hours.

iii. Surface Modification of Platinum-Tin-Rhodium Catalyst Having Alumina Support Matrix:
  Preheating about 50 g of heterogeneous catalyst such as platinum-tin-rhodium catalyst having alumina support matrix at temperature of about 100° C. to activate and to remove moisture from the catalyst. Separately, Triethyl aluminium (TEAL) solution is prepared having about 0.7% TEAL concentration in toluene. Activated heterogeneous catalyst is transferred to round bottom flask or a reactor under nitrogen atmosphere and about 40 ml of prepared TEAL solution is added under nitrogen atmosphere to round bottom flask containing the activated catalyst. TEAL solution is allowed to react with the activated catalyst surface for about 1 minute and excess amount of TEAL solution is removed under vacuum, followed by washing the unreacted TEAL from the surface of the catalyst by using about 40 mL (0.8 w/v) toluene having a moisture content ranging from about 20 ppm to about 40 ppm and removing the excess toluene from round bottom flask under vacuum. Adding about 40 ml of toluene having a moisture content ranging from about 200 ppm to about 400 ppm to round bottom flask and this moisture containing toluene is allowed to react with the heterogeneous catalyst for about 1 minute, followed by removing excess amount of toluene under vacuum. The catalyst is withdrawn from the round bottom flask and dried at a temperature of about 100° C. for a time period of about 24 hours and followed by calcinating at a temperature of about 500° C. for a time period of about 8 hours.

iv. Surface Modification of Platinum-Tin-Rhuthenium Catalyst Having Alumina Support Matrix:
  Preheating about 50 g of heterogeneous catalyst such as platinum-tin-ruthenium catalyst having alumina support matrix at temperature of about 100° C. to activate and to remove moisture from the catalyst. Separately, Triethyl aluminium (TEAL) solution is prepared having about 0.7% TEAL concentration in toluene. Activated heterogeneous catalyst is transferred to round bottom flask or a reactor under nitrogen atmosphere and about 40 ml of prepared TEAL solution (about 0.8 w/v) is added under nitrogen atmosphere to round bottom flask containing the activated catalyst. TEAL solution is allowed to react with the activated catalyst surface for about 1 minute and excess amount of TEAL solution is removed under vacuum, followed by washing the unreacted TEAL from the surface of the catalyst by using toluene having a moisture content ranging from about 20 ppm to about 40 ppm and removing the excess toluene from round bottom flask under vacuum. Adding about 40 ml of toluene having a moisture content ranging from about 200 ppm to about 400 ppm to round bottom flask and this moisture containing toluene is allowed to react with the heterogeneous catalyst for about 1 minute, followed by removing excess amount of toluene under vacuum. The catalyst is withdrawn from the round bottom flask and dried at a temperature ranging from about 1000° C. for a time period of about 24 hours and followed by calcining at a temperature of about 500° C. for a time period of about 8 hours.

b) Process for Surface Modification of Heterogeneous Catalysts Employing Multiple Reaction Cycles:

The process of surface modification of heterogeneous catalysts by employing multiple reaction cycles in the present disclosure is performed for the heterogeneous catalyst such as polymetallic catalyst selected from a group comprising platinum-tin-iridium catalyst, platinum-tin-rhodium catalyst, platinum-tin-ruthenium catalyst, platinum-tin catalyst, platinum-rhenium catalyst and platinum-germanium catalyst, by employing the process of the present disclosure. Herein below an example is provided with one of the polymetallic catalyst for illustrative purpose. However, the process described below should not be construed to be limiting to only the catalyst which is used for illustrative purpose.

Cycle 1: Preheating about 25 g of heterogeneous catalyst at temperature of about 120° C.; about 30 mL of Triethyl aluminium (TEAL) solution is separately prepared having 0.5% TEAL concentration in toluene (about 0.83 w/v). Activated heterogeneous catalyst is transferred to round bottom flask or a reactor under nitrogen atmosphere and about 30 mL of TEAL solution is added under nitrogen atmosphere to the round bottom flask containing activated catalyst. TEAL solution is allowed to react with the activated catalyst surface for about 1 minute and excess amount of TEAL solution is removed under vacuum, followed by washing the unreacted TEAL from the surface of the catalyst by using about 30 mL toluene having a moisture content ranging from about 20 ppm to about 40 ppm and removing the excess toluene from round bottom flask under vacuum. Adding about 30 mL toluene having a moisture content ranging from about 200 ppm to about 400 ppm to round bottom flask and this moisture containing toluene is allowed to react with the heterogeneous catalyst for about 1 minute, followed by removing excess amount of toluene under vacuum.

Cycle 2: To the TEAL reacted heterogeneous catalyst of cycle 1 about 30 mL (about 0.83 w/v) of TEAL solution having about 0.5% TEAL is added under nitrogen atmosphere in the round bottom flask or reactor. TEAL solution is further allowed to react with the TEAL reacted catalyst surface for about 1 minute and excess amount of TEAL solution is removed under vacuum, followed by washing the unreacted TEAL from the surface of the catalyst by using about 30 mL (0.83 w/v) of toluene having a moisture content ranging from about 20 ppm to about 40 ppm and removing the excess toluene from round bottom flask under vacuum. Adding about 30 mL (0.83 w/v) toluene having a moisture content ranging from about 200 ppm to about 400 ppm to the round bottom flask and this moisture containing toluene is allowed to react with the catalyst for about 1 minute, followed by removing excess amount of toluene under vacuum.

Cycle 3: To the TEAL reacted heterogeneous catalyst of cycle 2 about 30 mL (0.83 w/v) of TEAL solution having about 0.5% TEAL in the solution, is added under nitrogen atmosphere to the round bottom flask or a reactor containing reacted catalyst. TEAL solution is further allowed to react with the TEAL reacted catalyst surface for about 1 minute and excess amount of TEAL solution is removed under vacuum, followed by washing the unreacted TEAL from the surface of the catalyst by using about 30 mL (about 0.83 w/v) of toluene having a moisture content ranging from about 20 ppm to about 40 ppm and removing the excess toluene from round bottom flask under vacuum. Adding about 30 mL toluene having a moisture content ranging from about 200 ppm to about 400 ppm to round bottom flask and this moisture containing toluene is allowed to react on the catalyst for about 1 minute, followed by removing excess amount of toluene under vacuum.

In this example, the surface modification of the heterogeneous catalyst is performed by reacting the heterogeneous catalyst with TEAL solution for about 3 cycles. However, the number of cycles of reacting the heterogeneous catalyst with TEAL solution is not limited to 3 cycles. The heterogeneous catalyst can be reacted with TEAL solution for about 4 cycles, alternatively the heterogeneous catalyst can be reacted with TEAL solution for about 5 cycles, and alternatively the heterogeneous catalyst can be reacted with TEAL solution for about 6 cycles. In a non-limiting embodiment, the heterogeneous catalyst is reacted with the TEAL solution for about 3 cycles to about 6 cycles. The number of cycles of reacting the heterogeneous catalyst with TEAL solution depends on the desired layer of thickness of a modifying layer (aluminium oxide) on the heterogeneous catalyst. In a non-limiting embodiment, the thickness of the modifying layer on the surface of the heterogeneous catalyst after completion of one cycle of the reaction is about 8 nm to about 10 nm. Accordingly, the thickness of the modifying layer on the surface of the heterogeneous catalyst will depend on the number of reaction cycles performed.

Once it is believed that the desired thickness of TEAL solution is achieved on the catalyst, the reacted catalyst is withdrawn from the round bottom flask or any reactor and dried at a temperature of about 120° C. for a time period of about 16 hours and followed by calcinating at a temperature of about 550° C. for a time period of about 6 hours.

Example 2

Figure 1B:
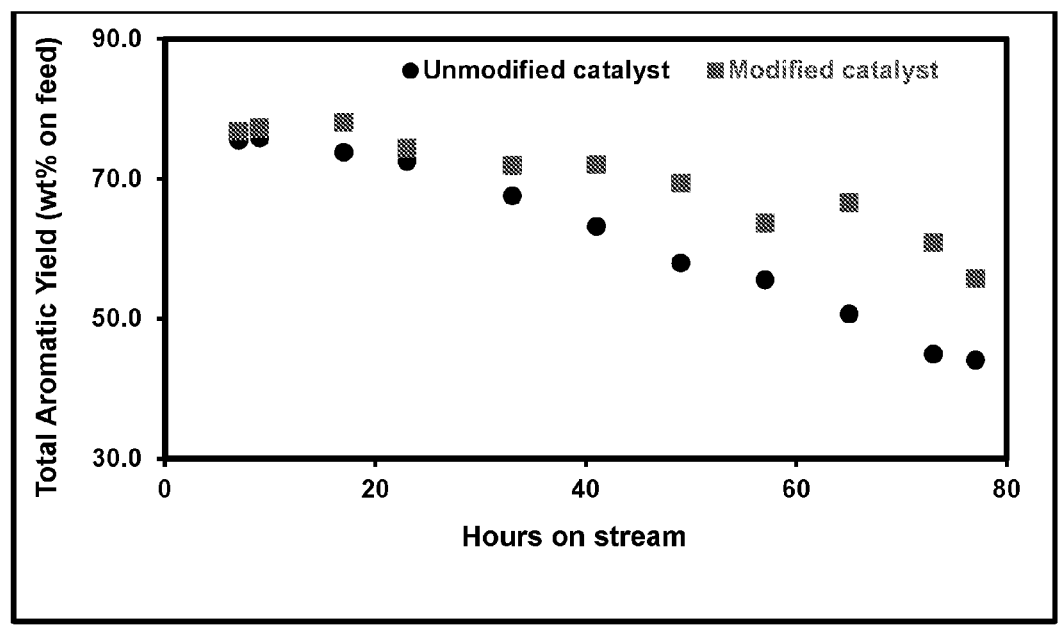
FIG. 1(b) illustrates yield of total aromatic compounds by Pt—Sn catalyst modified as per the process of the present disclosure, compared with un-modified catalyst.

Catalytic Activity of Surface Modified and Unmodified Catalyst for Naphtha Reforming Reaction Performance evaluation of unmodified Pt—Sn catalyst and modified alumina coated Pt—Sn catalyst by the process of present disclosure is carried out under identical reaction conditions i.e. at pressure of about 7.3 kg/cm2, H2/HC mole ratio of about 4, LHSV of about 1.95 h$^{-1}$, and at reaction temperature ranging from about 510° C. to about 540° C., respectively using naphtha feed. The aging effect and deactivation trend of the catalysts (modified and unmodified) are evaluated by plotting the C8 aromatics yield and total aromatics yield against the function of hours on stream (HOS) as shown in FIGS. 1(a) and 1(b). Up to about HOS 20, both catalysts showcased comparable performance, but as the reaction progressed, unmodified catalyst showcased a decreasing trend in both C8 aromatics and total aromatics yields due to faster deactivation of the catalyst. The decrease is more pronounced in total aromatics yield. On the other hand modified catalyst i.e. alumina coated Pt—Sn catalyst maintains good activity as measured in terms of C8 aromatics and total aromatics yields and shows better stability. At the end of the reaction (EOR) condition (HOS 77), modified catalyst shows C8 aromatic yield of about 24.3 wt %, which is about 4 wt % higher than that of unmodified catalyst (C8 aromatic yield-20.16 wt %). Further, the modified catalyst shows total aromatic yield of about 55.7 wt %, which is about 11 wt % higher than that of unmodified catalyst (total aromatic yield-44.1 wt. %). These results show that the modified catalyst described in the present disclosure, obtained by the process of the present disclosure gives improved performance in comparison to unmodified catalyst in terms of yield (of C8 aromatics and total aromatics) and stability. This significant improvement in the modified catalyst is due to 56% reduction in coke formation on the modified catalyst and reduced sintering which is achieved due to reduction in coke formation.

Example 3

Figure 2:
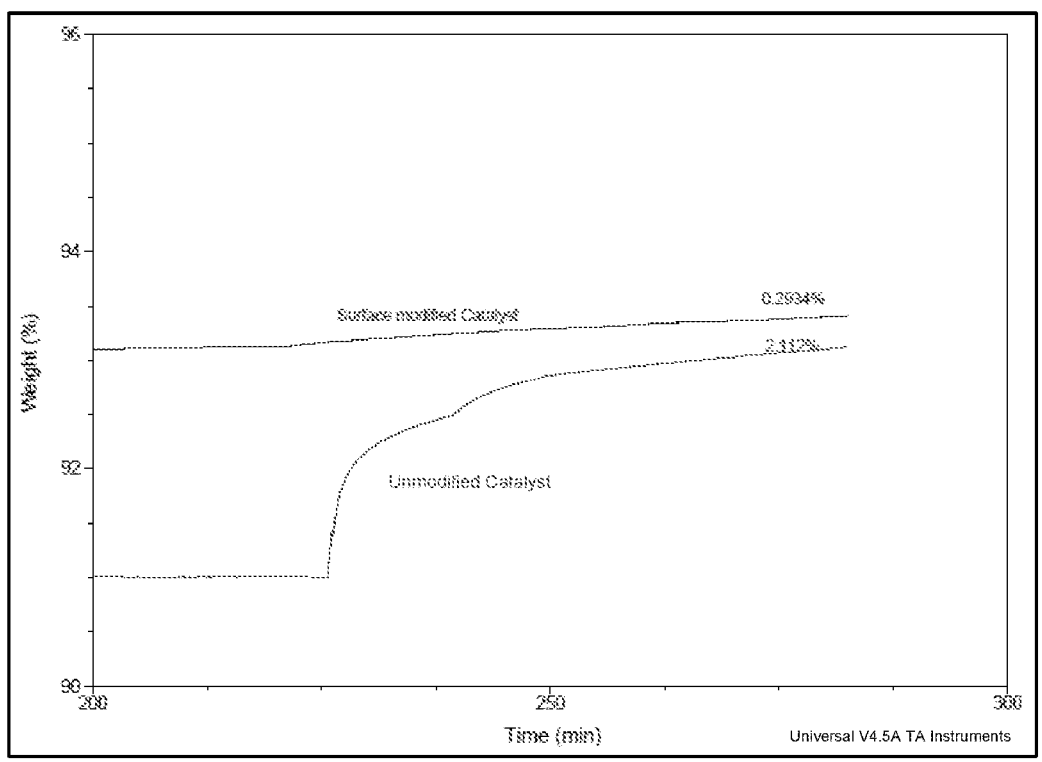
FIG. 2 illustrates in-situ thermo gravimetric analysis for ODHE reaction by Pt—Sn catalyst modified as per the process of the present disclosure, compared with un-modified catalyst.
Figure 3:
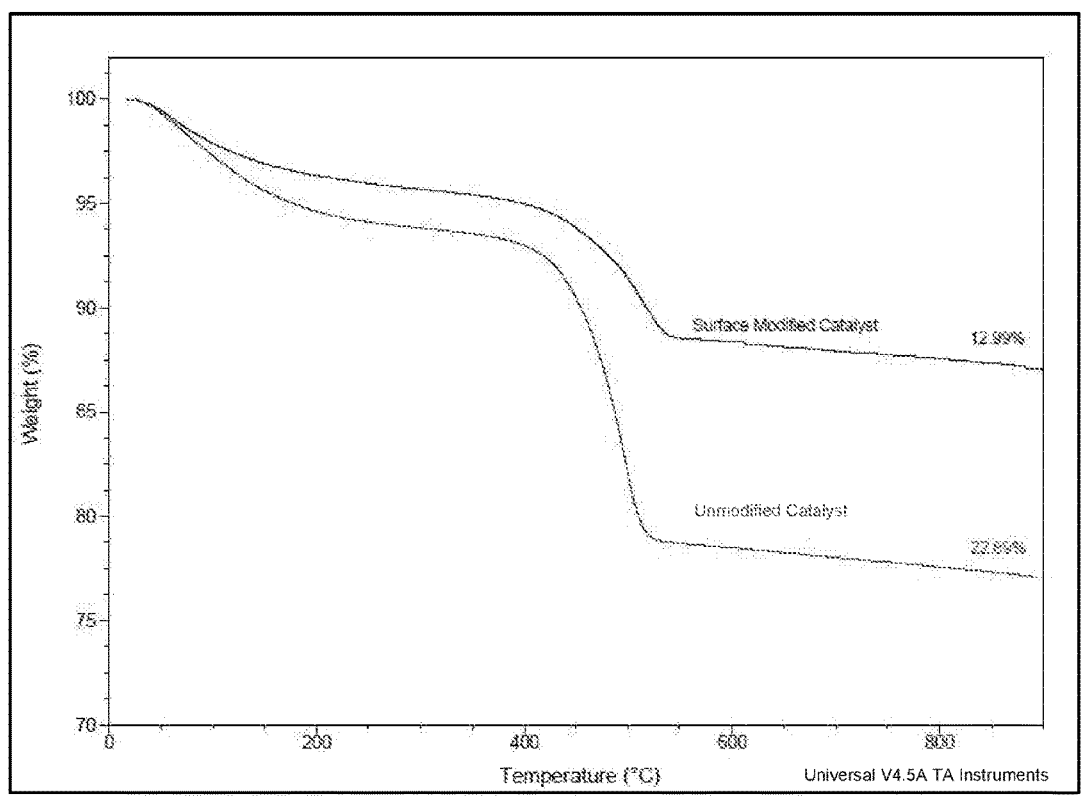
FIG. 3 illustrates thermo gravimetric analysis for spent catalyst modified as per the process of the present disclosure, compared with un-modified catalyst, wherein the catalysts are employed in naphtha reforming reaction.

Catalytic Activity of Surface Modified and Unmodified Catalyst for Modelled Oxidative Dehydrogenation of Ethane (ODHE) Reaction In-situ thermo gravimetric analysis measurement is performed to quantify the coke formation over surface modified and unmodified Pt—Sn catalyst during the ODHE reaction. The ODHE reaction is selected for coke analysis since catalyst deactivation occurs in this reaction due to heavy coke deposition. For analysis purpose, the flow rate of ethane is maintained at about 10.5 ml/min, oxygen is maintained at about 30.5 ml/min and helium is maintained at about 70 ml/min, respectively. Before starting the reaction, about 18 mg to about 20 mg of catalyst is preheated at the heating rate of about 10° C./min in about 10% oxygen/helium at a temperature of about 700° C. This condition is maintained for a time period of about 2 hours to activate the catalyst. Upon activating the catalyst, the temperature is decreased to a temperature of about 650° C. and then it is maintained for a time period of about 30 minutes to stabilize the instrument. At this temperature, ethane is passed over the catalyst for a time period of about 1 hour and change in the sample weight is noted during the in-situ ODHE reaction. The amount of coke formation in ODHE reaction is calculated on the basis of gain in weight after experiment is performed in the controlled reaction conditions. About 0.29% and about 2.11% weight gain in surface modified and unmodified Pt—Sn catalyst, respectively is observed after about 280 minutes of reaction. Moreover, about 86% reduction in the coke formation is observed when surface modified catalyst is used in ODHE reaction. The in-situ thermo gravimetric analysis measurement of the surface modified and unmodified catalyst is illustrated in FIG. 2.

Example 4

Analysis of Coke Deposition on Surface Modified and Unmodified Spent Pt—Sn Catalyst Subsequent to Naphtha Reforming Reaction Quantification analysis of coke deposition is carried out on surface modified and unmodified spent Pt—Sn catalyst after naphtha reforming reaction by thermo gravimetric analysis. TGA analysis is carried out using TA instruments (Q600) under air flow of about 100 ml/min. Analysis is carried out at temperature ranging from about 25° C. to about 1000° C. and heating rate is maintained at about 10° C./min. Initial weight loss is observed till a temperature of about 120° C. for both surface modified and unmodified Pt—Sn catalyst. This initial weight loss in both the catalyst is attributed to loss of moisture deposited on the surface. Subsequent to initial weight loss, the weight is observed to be constant till 400° C. in case of both the catalysts. Importantly, the weight loss for surface modified catalyst after a temperature of about 400° C. is observed to be about 13% only; whereas, in case of unmodified catalyst, weight loss is noted to be about 23%. The 10% less weight at 1000° C. for surface modified Pt—Sn catalyst compared to unmodified catalyst is due to reduced coke deposition. The reduced coke deposition on surface modified catalyst over unmodified catalyst represented the importance of the surface functionalization of heterogeneous catalyst carried out by the process of the present disclosure.

The present disclosure in view of the above described illustrations and various embodiments, is thus able to successfully overcome the various deficiencies of prior art and provide for an improved process for surface modification/functionalizing of heterogeneous catalyst including but not limiting to polymetallic catalyst and bimetallic catalyst.

Additional embodiments and features of the present disclosure will be apparent to one of ordinary skill in art based on the description provided herein. The embodiments herein provide various features and advantageous details thereof in the description. Descriptions of well-known/conventional methods and techniques are omitted so as to not unnecessarily obscure the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments in this disclosure have been described in terms of preferred embodiments, those skilled in the art will recognize that the embodiments herein can be practiced with modification within the spirit and scope of the embodiments as described herein.

Throughout this specification, the word "comprise", or variations such as "comprises" or "comprising" wherever used, will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

We claim:

1. A modified heterogeneous catalyst comprising at least one modifying layer on surface of a heterogeneous catalyst, wherein the surface of the heterogeneous catalyst is modified, which causes surface functionalization of the heterogeneous catalyst, and wherein the heterogeneous catalyst is bimetallic catalyst or polymetallic catalyst.

2. A modified heterogeneous catalyst as claimed in claim 1, wherein the modifying layer on the surface of the heterogeneous catalyst has a thickness ranging from about 6 nm to about 12 nm and wherein the modifying layer is aluminium oxide.

3. The modified heterogeneous catalyst as claimed in claim 1, wherein the polymetallic catalyst is selected from a group comprising platinum-tin-iridium catalyst, platinum-tin-rhodium catalyst, platinum-tin-ruthenium catalyst, platinum-tin catalyst, platinum-rhenium catalyst and platinum-germanium catalyst.

4. The modified heterogeneous catalyst as claimed in claim 1, wherein the modifying layer of the heterogeneous catalyst prevents carbon deposition of more than 2 wt % on surface of the heterogeneous catalyst per kg of a feed in a reaction selected from a group comprising oxidative dehydrogenation reaction and naphtha reforming reaction.

* * * * *